Oct. 8, 1963 K. K. SPJELDNES 3,106,615
COMMUNICATION SWITCHING SYSTEM
Filed Dec. 22, 1958 5 Sheets-Sheet 1

INVENTOR.
Kare K. Spjeldnes
BY C. R. Sipe
Atty.

Oct. 8, 1963 K. K. SPJELDNES 3,106,615

COMMUNICATION SWITCHING SYSTEM

Filed Dec. 22, 1958

5 Sheets-Sheet 2

INVENTOR.
Kare K. Spjeldnes

BY C. R. Sipe

Atty.

INVENTOR.
Kare K. Spjeldnes
BY C. R. Sejne
Atty.

INVENTOR.
Kare K. Spjeldnes
BY C. R. Sipe
Atty.

Oct. 8, 1963 K. K. SPJELDNES 3,106,615

COMMUNICATION SWITCHING SYSTEM

Filed Dec. 22, 1958 5 Sheets-Sheet 5

INVENTOR.
Kare K. Spjeldnes
BY C. R. Sipe
Atty.

3,106,615
Patented Oct. 8, 1963

3,106,615

COMMUNICATION SWITCHING SYSTEM

Kare K. Spjeldnes, Glen Ellyn, Ill., assignor to Automatic Electric Laboratories, Inc., a corporation of Delaware Filed Dec. 22, 1958, Ser. No. 782,067
22 Claims. (Cl. 179—18)

This invention relates to a communication switching system, and more particularly, to an electronic crosspoint telephone switching system.

It is an object of this invention to provide new and improved methods and arrangements for interconnecting the switching control units, and for transmitting control signals between switching groups used in setting up a communication path between two telephone lines.

In automatic telephone switching systems, an exchange comprises switching apparatus for selectively connecting any two lines served by the exchange, and also for connections to or from other exchanges. Usually the switching apparatus is divided into groups, each group serving a number of lines. One or more switching stages are usually provided to concentrate the lines to a smaller number of links. Distribution switching stages are provided to selectively connect these links and incoming trunks to intergroup or outgoing trunks. In some systems additional switching apparatus is provided for interconnecting the line groups.

Various types of switching elements are known in the art for the connections through which communication signals are transmitted. These include metallic contacts with various types of operating mechanisms, and electronic crosspoints such as gas tubes or semi-conductors. In other systems, instead of switching elements, time division multiplex switching arrangements are used.

The selection and operation of the switching apparatus is controlled in accordance with supervisory signals received from the lines or trunks. These supervisory signals include a service request such as closure of the D.C. loop of the subscriber line by removing the handset from the switchboard at the station, and switch control signals such as dial pulses to designate the line being called. The communication path is established in accordance with these supervisory signals.

It is known to provide each group of switching apparatus with a scanner which tests the line circuits and incoming trunk circuits of the group. When a service request is received, the scanner causes an effective signal connection to be established from the line or trunk circuit to a digit register, and then causes the dial pulses or other switch control signals to be transmitted to the register each time this line or trunk circuit is scanned. The registered information is then used to operate other control units in finding an idle path and establishing a connection from the line or incoming trunk to an intergroup or outgoing trunk. Control signals must then be sent to control apparatus of subsequent switching stages to complete the connection. In the known arrangements these switching control signals are set either over separate control circuits, or are coupled to the output side of the switching apparatus of the calling line group for transmittal over the trunk.

According to the invention, in a switching system in which the line and incoming trunk circuits are scanned for supervisory signals which are then transmitted to a digit register for setting up the connection within the calling-line group, an arrangement and method is provided for transmitting control signals from the digit register through the line circuit, then over the established communication path, and over the trunk to the switching group or exchange in which the called lines is located.

In a preferred embodiment of the invention, the switching elements in the communication path are electronic crosspoints. The signal connections between the scanner, the digit register, and other control units employ time division multiplex techniques. The scanner, in addition to receiving supervisory signals from the line and incoming trunk circuits, forms a part of the effective connection for transmitting control signals from the digit register to the line circuits. A single common translator is provided for performing all the translation functions of the exchange.

Further, according to the invention, the intergroup trunks are connected to transmission control units, referred to herein as junctors, in the called-line group. The control signals from the calling-line group are received by the junctor associated with the particular intergroup trunk, and are transmitted to switching control apparatus which causes a crosspoint connection to be established to the called line. The junction holds all the crosspoints in the connection between the two lines. The scanner is used to test the called line for busy, and to transmit ringing control signals thereto. Ringback tone is sent over the crosspoint connection to the calling line.

The above-mentioned, and other objects and features of the invention and the manner of attaining them will become more apparent, and the invention itself will be best understood by reference to the following description of an embodiment of the invention taken in conjunction with the accompanying drawings comprising FIGS. 1–7, wherein.

Figures 1, 7:
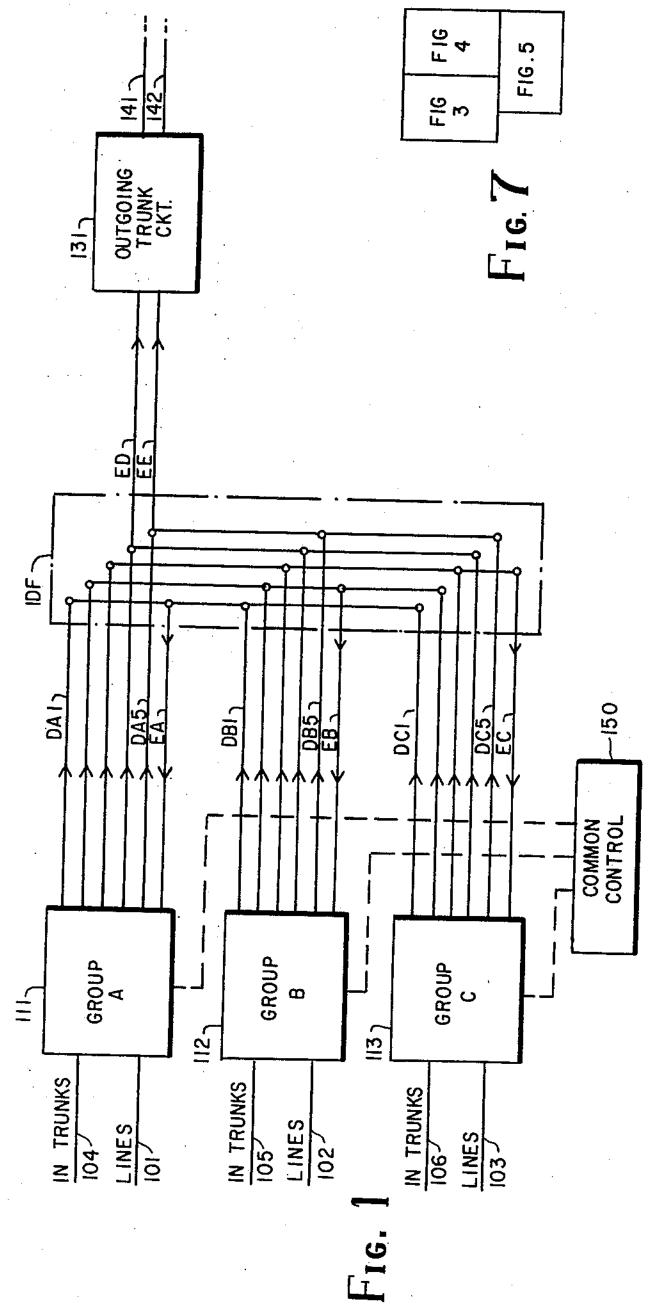
FIG. 1 is a block diagram of a telephone switching exchange embodying the principles of the invention.
Figure 6:
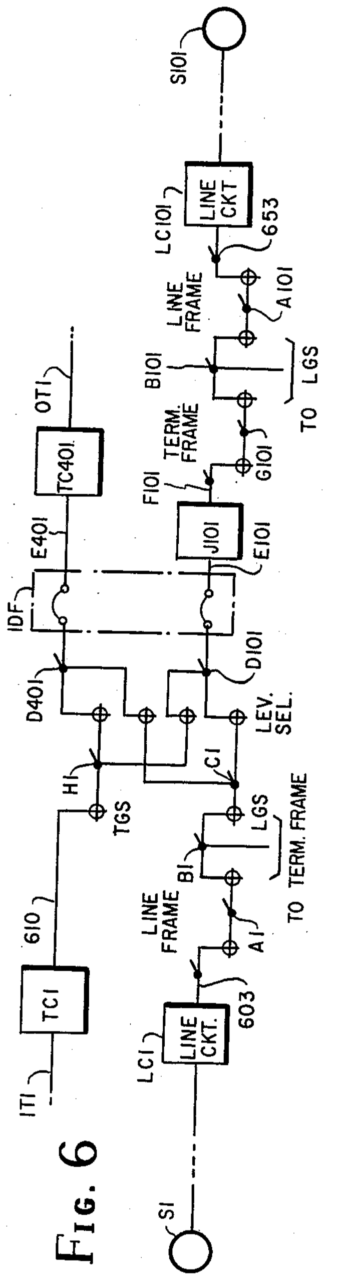
Figure 2:
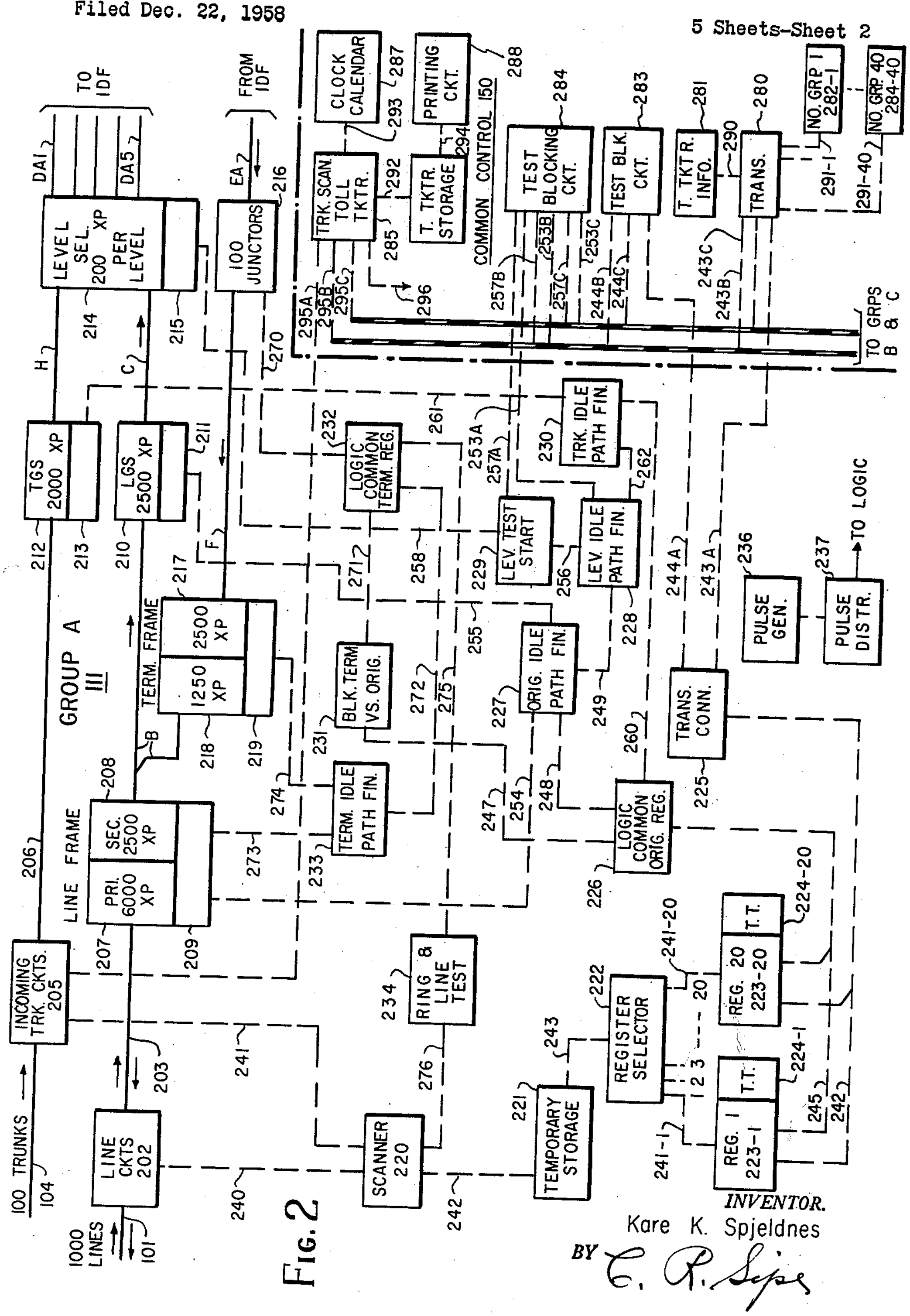
FIG. 2 is a block diagram showing the switching stages and control units of one group and the common control equipment of FIG. 1.
Figure 3:
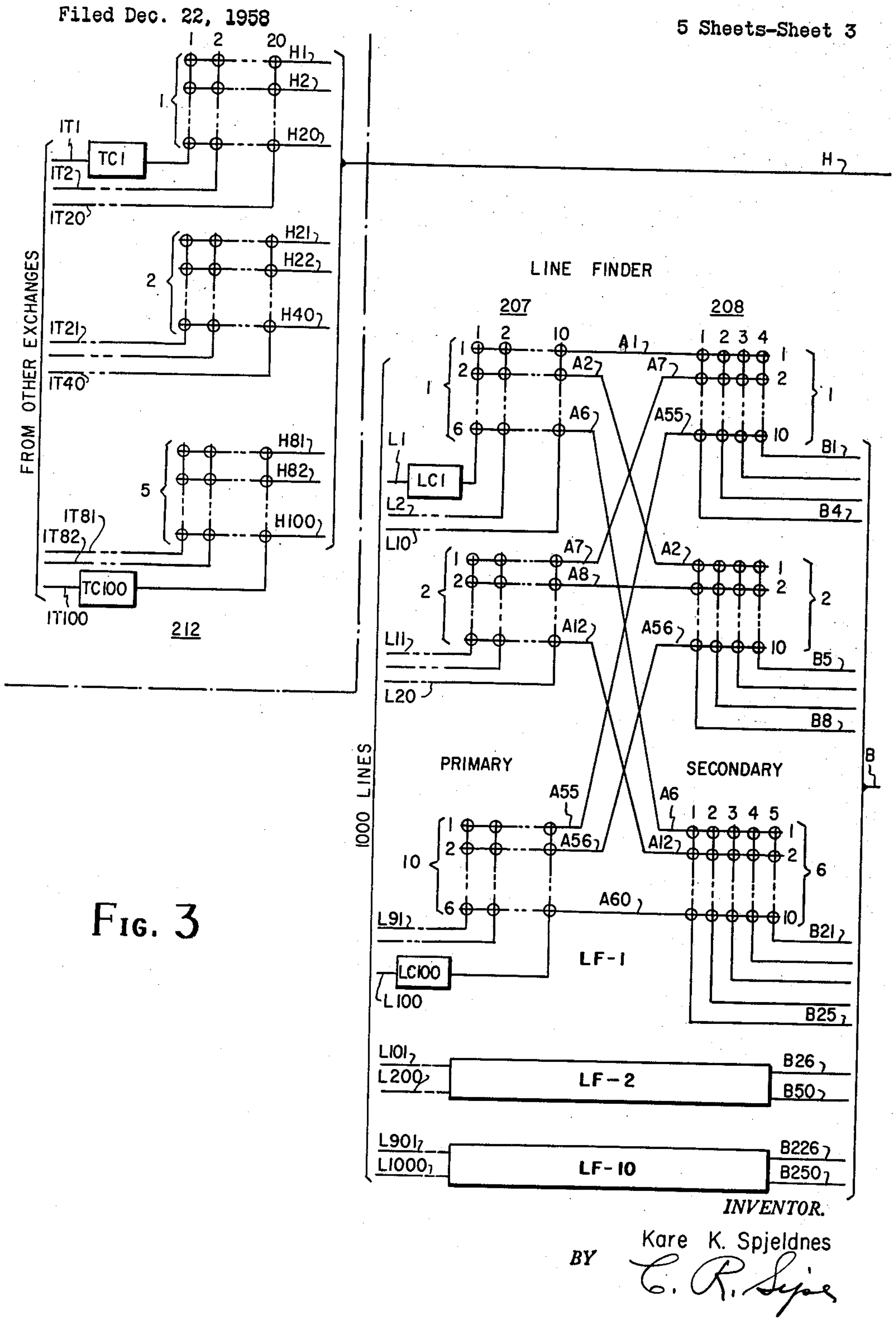
Figure 4:
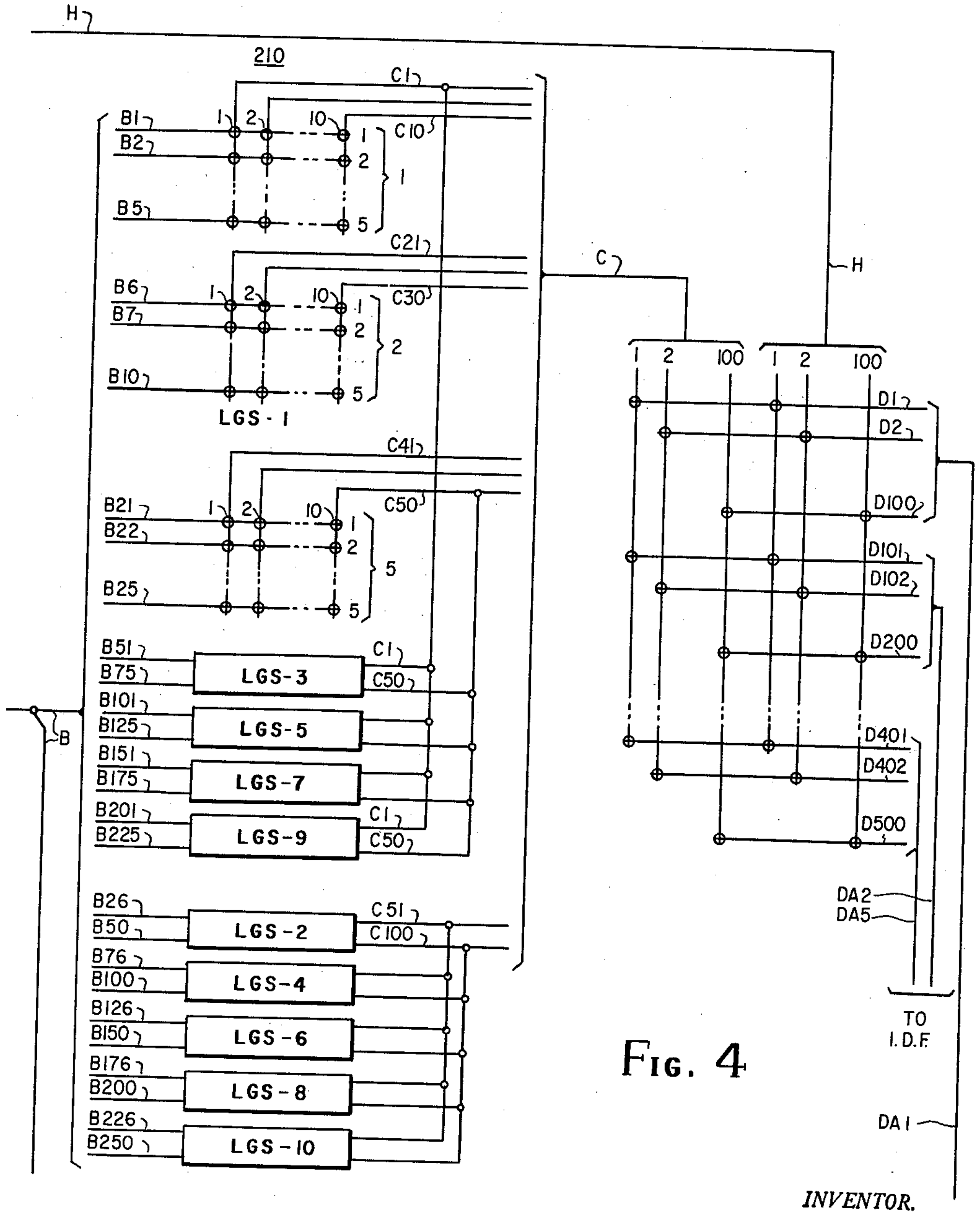
Figure 5:
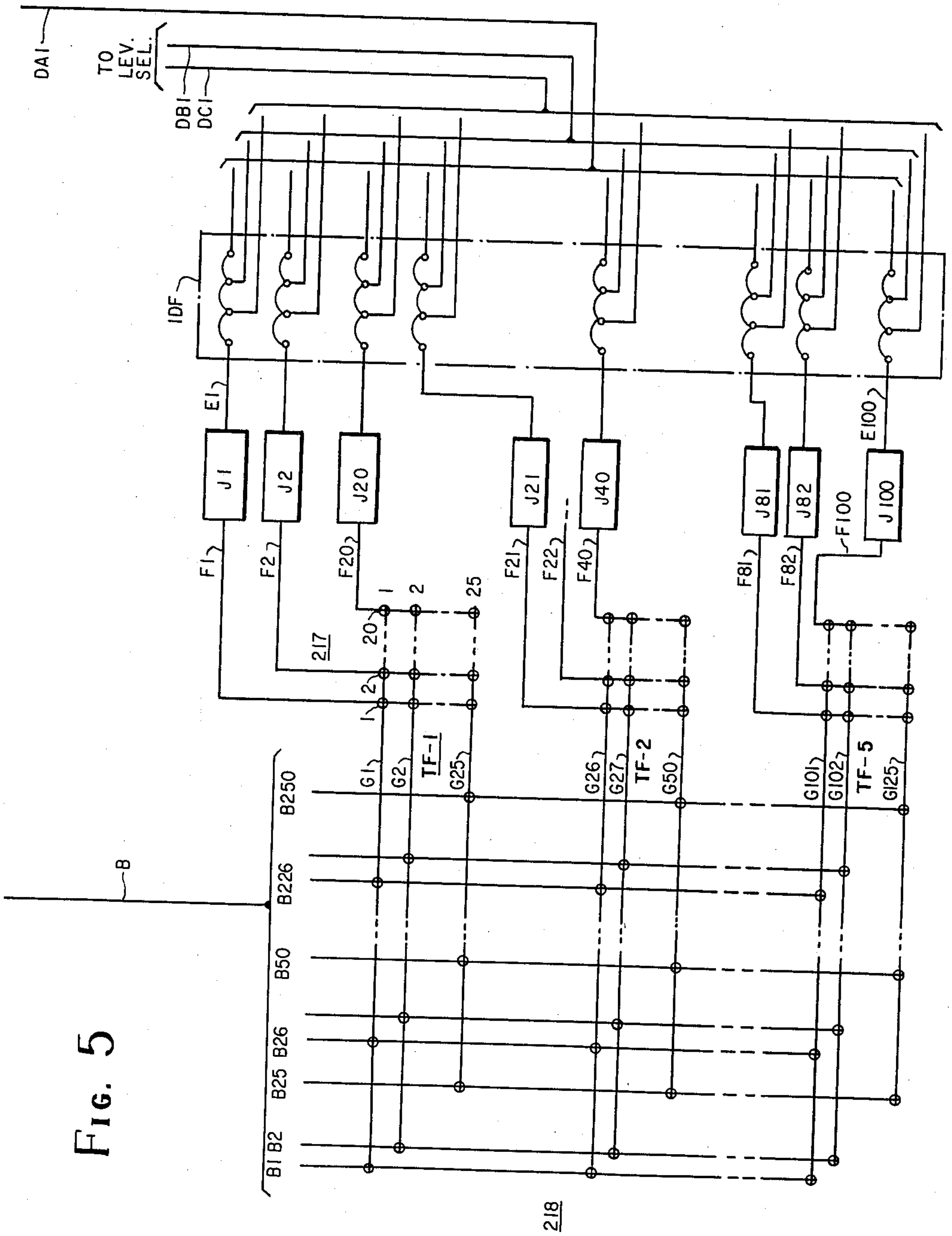

FIGS. 3, 4, and 5 taken together, are a single line trunking diagram of the crosspoint switching network shown in block diagram form in the top portion of FIG. 2;

FIG. 6 is a single-line trunking diagram showing typical connections between lines and trunks; and FIG. 7 shows the manner in which FIGS. 3, 4 and 5 are arranged adjacent each other.

Referring to FIG. 1, three groups of switching apparatus are shown within an exchange, group A comprising equipment 111, group B comprising equipment 112 and group C comprising equipment 113. Each of these group equipment units includes control equipment, and in addition, control equipment 150 is common to the three switching groups. Group A may serve one thousand local subscriber lines 101, and one hundred incoming trunks 104; and similarly groups B and C serve lines 102 and 103 respectively, and trunks 105 and 106 respectively. Each group may make connection at its output to different trunking levels, with up to one hundred trunks per level. There may be as many levels as desired, and in the drawing, five levels of trunks are shown from each group, DA1 to DA5 from group A, DB1 to DB5 from group B, and DC1 to DC5 from group C. These trunks extend to jumper terminals of an intermediate distribution frame IDF for connections to junctors in the called line switching group or to the outgoing trunk circuits 131. The trunks from level one are connected to the trunks EA to group A, from level two to the trunks EB to group B, from level three to the trunks EC to group C, and from levels four and five to the trunks ED and EE to the outgoing trunk circuits 131, and thence to the outgoing trunks 141 and 142 respectively.

Referring to FIG. 2, the crosspoint network in equipment 111 of group A comprises a line frame having a primary stage 207 and a secondary stage 208, a local group selector stage 210, a level selector stage 214, and a terminating frame comprising two stages 217 and 218, and also a trunk group selector 212. The subscriber line circuits 101 are coupled through the line circuits 202 and conductors 203 to the primary stage 207 of the line frame, the primary stage 207 and secondary stage 208 are connected by links A (not shown in this figure) the secondary stage 208 and the line group selector 210 are connected by links B, and the line group selector is connected to the level selector by links C. The incoming trunks 104 are coupled through the incoming trunk circuits 205 and conductors 206 to the trunk group selector 212, and the trunk group selector is connected to the level selector 214 by links H. The trunks in levels DA1 to DA5 are connected to the distributing frame IDF and from the frame IDF trunks EA are connected to junctors 216. The junctors are connected to the first stage 217 of the terminating frame by links F, the two stages 217 and 218 are connected by links G (not shown in this figure), and the second stage 218 is connected to the secondary 208 of the line frame by links B.

The link crosspoint arrangement is shown in FIGS. 3, 4 and 5, which should be arranged as shown in FIG. 7. The line frame (FIG. 3) is divided into ten primary-secondary units LF–1 to LF–10 each serving one hundred subscriber lines. Each unit is divided into crosspoint arrangements which may be referred to as switches. The term switch as used here means a crosspoint arrangement for connecting any one of $n$ lines, links or trunks to any one of $m$ lines, links or trunks. In the unit LF–1 the primary stage comprises ten (10×6) switches, the first of which connects any one of lines L1 to L10 to any one of links A1 to A6, the second connects any of L11 to L20 to any of links A7 to A12, and so on to the tenth switch which connects any of lines L91 to L100 to any of links A55 to A60. The secondary stage comprises five (4×10) switches and one (5×10) switch. The primary-secondary links A1 to A60 are arranged so that each primary switch has a link to each secondary switch. The secondary switches connect to links B1 to B25. Thus the primary switches of unit LF1 contains six hundred crosspoints and the secondary stage contains two hundred fifty crosspoints. The units LF2 to LF10 have similar arrangement, so that the line frame contains a total of six thousand crosspoints in the primary stage 207 and twenty-five hundred crosspoints in the secondary stage 208. Each one hundred lines are concentrated in the two stages of the line frame to twenty-five links B.

The line group selector 210 (FIG. 4) is divided into ten units LGS1 to LGS10. Each comprises five (5×10) switches, each of which connects any one of five links B to any one of ten links C, so that each LGS unit connects twenty-five B links to fifty C links. The B links B51 to B250 are connected in groups of twenty-five to the units LGS2 to LGS10. The output of each of the units LGS3, 5, 7, and 9 are connected to the links C1 to C50, and the outputs of each of the units LGS2, 4, 6, 8, and 10 are connected to links C51 to C100. Thus it may be seen that each of the line-finder units has twenty-five links B to correspondingly numbered line group selector units with access to fifty links C.

The trunk group selector 212 (FIG. 3) comprises five (20×20) switches, the first for connecting any one of the incoming trunks IT1 to IT20 to any one of the links H1 to H20, the second for connecting any one of the incoming trunks IT21 to IT40 to any one of the links H21 to H40 and so on to the fifth switch for connecting any one of the incoming trunks IT81 to IT100 to any one of the links H81 to H100. The incoming trunks IT1 to IT100 are connected to the switch terminals through trunk circuits TC1 to TC100 respectively.

The level selector 214 (FIG. 4) comprises 200 crosspoints per level. Each of the trunks D is connected to two crosspoints, one for connection to one of the C links and the other for connection to one of the H links, thus giving each C link and each H link access to one trunk D per level. Each of the trunks D is connected to a set of terminals on the intermediate distribution frame IDF.

In FIG. 5 the trunks DA1, DB1, and DC1 of level 1 are shown connected through jumpers on the distribution frame IDF to trunks E1 to E100, which are connected to the junctors J1 to J100 of group A. The junctors contain the transmission circuits and amplifiers for locally terminated calls. For outgoing calls this equipment is located in the outgoing trunk circuits 131 (FIG. 1). Since the communication path for any call will contain a maximum of eight crosspoints in tandem, all of the amplification may be contained in one unit. The junctors also serve to couple control signals from the trunks E to switching control apparatus for setting up the connection from the junctor to the called line, as will be explained with reference to FIG. 2.

The terminating frame, which has a first stage 217 and a second stage 218, comprises five units TF1 to TF5. Each of these five units comprises a (20×25) switch in the first stage and twenty-five (1×10) switches in the second stage. Each unit serves twenty junctors. Junctors J1 to J20 are connected by links F1 to F20 respectively to the first stage of unit TF1. Links G1 to G25 connect the two stages, with each link G having access to ten of links B, one to each of the line frame units LF1 to LF10. Each of the units TF2 to TF5 have a similar crosspoint arrangement, each serving twenty junctors. Thus each unit of the terminating frame has five hundred crosspoints in the first stage and two hundred and fifty in the second stage, making a total for the frame of twenty five hundred crosspoints in stage 217 and twelve hundred and fifty crosspoints in stage 218.

The control equipment associated with the switching equipment for group A, along with the common control equipment 150, and the arrangement and method for interconnecting the equipment units is shown in block diagram in FIG. 2. Detailed circuits for performing the various functions are well-known in the art. For example see the Bell System Technical Journal, September 1958, and the references there cited.

The various control units are effectively connected to one other by employing time division multiplex techniques. The common transmission medium for the multiplex signals, referred to herein as highways, are shown in FIG. 2 by dashed lines.

The scanner 220 scans the one thousand line circuits 202 over highway 240 and the one hundred incoming trunk circuits 205 over highway 241 on a time division basis. Eleven hundred gate circuits are provided for the line and trunk circuits, and additional gates are provided for connection over highway 242 to a temporary storage unit 221. Testing and ring start signalling for a called line are also transmitted from a ring and line test unit 234 over highway 276. Assuming dial signals with a speed of twenty pulses per second, a multiplex pulse repetition rate of 12.5 milliseconds would be satisfactory.

The slow speed multiplex system used herein for control signals may be compared to the time division multiplex systems for voice frequency signals wherein a pulse repetition rate of 0.1 millisecond is common, and the multiplex pulses are 2 microseconds or shorter. With the slow speed arrangement the transistors, ferrite cores and other devices will be considerably lower in cost per device.

Twenty registers 223–1 to 223–20 are provided which may be selectively connected through a register selector 222, through the temporary storage unit 221 and the scanner 220 to the line or trunk circuits. To each register may be added, on a plug-in basis, toll ticketing storage information when needed by means of units 224–1 to 224–20.

The originating switching control apparatus includes a logic common originating register 226, originating idle path finder 227, a level idle path finder 228, a level path start unit 229, and a trunk idle path finder 230. The terminating switching control apparatus includes a logic common terminating register 232, and a terminating idle path finder 233. Also, since calls are processed one at a time, a blocking terminating versus originating unit 231 is provided. Each of the switching units also includes an arrangement for connecting a crosspoint network to the control circuits, comprising the unit 209 of the line frame a unit 213 for the trunk group circuit, a unit 215 for the level selector, and a unit 219 for the terminating frame.

The translator 280 is common to all the groups of the exchange. Each group includes a connector 225 between the registers and the translator. No provisions for translation are made in any of the individual registers. Among the very good reasons why the translator should be common equipment, is the time-saving for central office personnel by having rerouting incorporated in one place only.

The translator is called into service also for local calls which need the assistance of the number group. There are forty number groups 282–1 to 282–40. These are connected to the translator by links 291–1 to 291–40. One number group consists of one thousand directory numbers. Since there will be many changes made in the number group because of factors such as people moving, regrading, and the like, the number group changes should be done by push-button telephone in the central office or any other centralized location. The number group should therefore be able to erase, as well as store, any local subscriber's number.

The common control equipment 150 also includes a blocking circuit 283 for controlling the connections between the registers and the translator on a one-at-a-time basis, and a test blocking circuit 284 for preventing all but one group from testing in any one level at any time.

Toll ticketing equipment may also be added to the present system. This circuitry would include a trunk scanner 285 which scans all the incoming and outgoing toll trunks. The trunk scanner has the function of connecting itself to a toll ticketing trunk when this seized. It is a register which stores the necessary information to be printed. The toll ticketing equipment also includes a clock calendar 287, toll ticketing storage unit 286, and a printing circuit 288. A unit 281 provides toll ticketing information to the translator.

Standard features of this system include the following:

Terminal per station.

Provision made in the logic circuit so Toll Ticketing equipment can easily be added (both manual and automatic).

Centralized panel for rerouting, change of office code, regrading.

Centralized panel for renumbering to two-five system, national dialling, toll ticketing prefix, test suffix or prefix, time disconnect, if required.

Centralized panel for sending pulse speed, coded sending, multi-frequency sending, delete and adding of digits, number of dial stop, six digit translation.

Provision made for calling party on own line by directory number of special code.

Provision made for automatic intercept and automatic message account.

Provision made for automatic trouble recorder.

Provision made for automatic routine tester of inside as well as outside plant.

Provision made for automatic traffic recorder and peg-count meters.

*Operation*

In the operation of the system, various units are effectively connected during a particular time slot, in some cases, to the principal line and trunk scanning highway. The word "attached" will be used herein to refer to such an effective connection.

Assume that one of the local lines of group A makes a call to another local line. A receiver off the hook is detected during the time slot assigned to that line. The temporary storage unit 221 stores the identity of the calling line, and attaches itself to the register selector 222 over highway 243, and the selector in turn attaches one of the registers to the calling line over one of the highways 241–1 to 241–20. Dial tone is extended to the line via a gate circuit per line, under supervision from the register on a time division basis.

Dial pulses from the calling line are now stored in the register. The register, which is made of ferrite cores, takes full advantage of the writing and rewriting technique associated with such cores. The register stores the dialled information, and after one, three, seven and possibly ten received digits, attaches itself each time to the translator to obtain guidance as to how to proceed. The translator is heavily loaded in this way, but the occupancy factor is a fraction of a millisecond. Relieving the register of all translating functions, fifty ferrite cores would be needed to store a ten digit number.

After seven digits have been dialled, indicating a local call, the register will send these digits on a coded basis over the multiplex highway 242, through the connector 225 and highway 243A to the translator 280. The registered information will thereby be erased in the register. The translator next writes a new number into the register. A proper number group is always called into service by the translator on a local call except when a special number is dialled. One number group comprises one thousand directory numbers. Therefore only three digits are received. The number group translates these three digits and returns seven bits of information.

(1) One code indicating the proper thousand-line group.

(2) Hundreds marking within that thousand-line group.

(3) Tens marking within that thousand-line group.

(4) Units marking within the thousand-line group.

(5) Ringing frequency (or code) to be applied.

(6) Test call (to override busy).

(7) Whether or not P.B.X call.

The register is now in control of routing the call through the exchange. It possesses for this purpose all of the information received from the number group, and further, information received from the temporary storage giving the identity of the calling line.

The calling line identity together with the code received from the number group indicating the proper thousand-line group which indicates the level to connect to, is transferred from the register over the highway 245 to the logic common originating register unit 226 for further processing in the originating switching control equipment. However this transfer of information is not established until permission has been obtained from the blocking-terminating-versus-originating unit 231 over highway 247, to avoid interference with an already progressing call, since only one call can be set up at a time.

The unit 226 now attaches itself to the originating idle path finder 227 over highway 248, and to the level idle path finder 228 over highway 249, the later unit in turn obtaining permission over highway 253A from the test blocking unit 284 to test in proper level without interfering with another group. Since the logic circuits permit only one call at a time to be processed, there is no interference from the other time slots during the described process of the logic circuits.

The originating idle path finder 227, which may consist of ferrite cores, contains stored information regarding busy links and crosspoints in the line frame and local group selector stages. This information may be cancelled directly by means of signals from the crosspoints themselves upon releasing of the crosspoint connection.

The originating and level idle path finders 227 and 228 may operate on a cut and try method with the hunting action which proceeds as follows: The originating path finder 227 hunts over the idle crosspoints, one at a time, in the line frame where the calling line is located. A sequence switch provides for test rotation and is always sitting on an idle path. Assuming one idle path through the line frame has been found, this link has then an availability of ten in the local group selector stage. From this stage on, the level idle path finder 228 takes over and connects the ten LGS links C to the selected level where ten junctors are tested (over the crosspoints) for idle condition on one-at-a-time basis. Idle conditions would mean that a positive potential is available for test in the junctor or trunk. This hunting method which could be termed "direct path system" in contrast to "by path system" does away with the numerous bypath test links. However, a blocking of the subscriber's line is incorporated during the testing.

Assuming that the originating idle path finder 227 has to make ten steps before an idle junctor is found, the level idle path finder 228 has then made one hundred steps. The total allowable time for one call to be routed through the group should not be in excess of two hundred milliseconds for the traffic load involved. Introducing a safety factor of two, the pulse repetition rate could then be one millisecond, which is a very low speed logic circuit.

After a junctor has been connected to the cross-point circuit, the originating switching control units release, and a connection has been established from the register via the highway through the scanner to the line circuit, thence over the crosspoints (two in the line frame, one in the local group selector, and one in the level selector) to the junctor.

According to the invention, pulse signals are then sent from the register over the multiplex connection to the line circuit, and thence over the crosspoints to the junctor. The junctor then calls in the logic common terminating register 232. The second half of the routing then begins. The logic common terminating register 232 obtains permission from the blocking-terminating-versus-originating unit 231 to seize the logic circuits.

The following information has been sent from the register to the logic common unit 232:

(1) Hundreds marking.
(2) Tens marking.
(3) Units marking.
(4) Ringing frequency (or code).
(5) Whether or not a P.B.X call.

This information then enables the terminating idle path finder 233 to hunt for an idle path over the terminating frame and the line frame to the called party's line circuit. This hunting is accomplished on a one-at-a-time basis similar to that which has been described for the originating part of the routing.

The line test is established from unit 232 over highway 275, through the ring and line test 235, over highway 276, and thence to the scanner and over the scanning highway 240. The ringing voltage is applied through the line directly in the line circuit via a proper gate circuit. Ring back signal is transmitted over the crosspoints directly from the called line's circuit.

The junctor contains the transmission circuit, and circuitry for holding the crosspoints operative during conversation.

In case the called line is busy, the junctor releases and thereby drops the entire crosspoint connection. Busy tone is then extended to the calling line directly from its own line circuit under supervision of the register. This is the only case in which the register continues being connected to the line after a crosspoint connection has been established. A timing device, however, releases the register after a five to ten second interval, which should be adjustable. The calling line then receives dial tone again if the receiver has not been replaced on the hook in the meantime.

In case of an outgoing toll ticketing call the same hunting procedure as described takes place up to a trunk level. In addition, however, information from the toll ticketing information unit 224-1 to 224-20 associated with the register is then transmitted over a highway such as highway 296 from the outgoing trunk circuit for further processing.

Referring now to FIG. 6, typical connections which may be set up through the switching crosspoints are shown. Assuming that the subscriber at station S1 on line L1 originates a call by removing his receiver from the switchhook, this service request is transmitted to his line circuit LC1. This service request is detected by the control equipment as described above, and the subscriber may proceed to dial the number of the called party into the selected register. This originating portion of the crosspoint connection is then set up, and it may extend from the line circuit over conductor or conductors 603, thence through crosspoints in the line frame through link A1 to link B1, thence through the crosspoints in the local group selector to link C1 to the level selector. If a subscriber S101 on line L101 in group B is being called, the connection may then extend to a crosspoint in the level selector to intergroup trunk B101, through a jumper on the distribution frame IDF, thence over link E101 to junctor J101. The control signals are then transmitted to the junctor and to the terminating switching equipment of group B as described above to set up the terminating portion of the connection. This connection may be from the junctor over link F101 through crosspoints in the terminating frame including link G101 to link B101 to the line frame, and then to the crosspoints in the line frame including the link A101 to conductor or conductors 653 to the line circuit LC101.

If a call is made from station S1 to a line in another exchange, the connection up to the link C1 is established as for the local call, and then if the called party is in the fifth level, a connection may be made through a crosspoint of the level selector to the trunk D401, and thence through the jumper in the distributing frame IDF and over the link E401 to the trunk circuit 401, and thence out over the outgoing trunk OT1.

For a call incoming from another exchange on trunk IT1, the service request appearing in trunk TC1 causes the scanner to connect a register which records the incoming control signals designating the number of the called party. This information then is used to set up a connection over the conductor or conductors 610 through a crosspoint in the trunk group selector to a link H1. If the called party is in a local group such as group B, the connection is then established through a crosspoint from the level selector to the link such as D101 through the jumper of the distributing frame IDF and over the link E101 to the junctor J101. The control signals are then transmitted to the junctor and thence to the terminating switching control equipment to set up the connection to the called station S101 as for a local call.

If the call on trunk IT1 is for a tandem connection through to another exchange, the connection is extended from link H1 through a crosspoint in the level selector to the trunk such as D401 and thence through the distributing frame IDF and the trunk circuit TC401 to the outgoing trunk OT1 as for a locally originated call.

While I have described above the principles of my invention in connection with specific apparatus, it is to be clearly understood that this description is made only by way of example and not as a limitation to the scope of my invention.

What is claimed is:

1. In a communication switching system, a plurality of lines, each having an individual line circuit which may receive supervisory signals from its line, a plurality of trunks, switching means for selectively connecting the line circuits to the trunks, switching control apparatus, a digit register, a scanner connected to said line circuits to test the corresponding lines for supervisory signals, means for establishing an effective signal connection from a selected one of said line circuits through the scanner to the digit register, means including the said signal connection for registering line supervisory signals in said digit register, means in said switching control apparatus under control of said digit register for finding and establishing a communication path through said switching means from said one line circuit to one of said trunks, and means for transmitting control signals from said digit register to said one line circuit, thence over said communication path through said switching means to said one trunk.

2. In a communication switching system the combination as claimed in claim 1, wherein said means for transmitting control signals from said digit register to said one line circuit comprises an effective signal connection including said scanner.

3. In a communication switching system the combination as claimed in claim 1, wherein said switching means comprises a plurality of switching stages arranged in tandem, each stage comprising a plurality of switching elements arranged in coordinate arrays.

4. In a communication switching system the combination as claimed in claim 1, further including a pulse generator and a pulse distributor for supplying pulses in repetitive time position frames to the units including the said line circuits, said scanner, said digit register, and said switching control apparatus, multiplex conductors inter-connecting said units, and means in said units enabled by said repetitive pulses for providing multiplex signal channels in respective time slots of said frames, the effective signal connections for transmitting control signals being supplied by said multiplex channels.

5. In a communication switching system according to claim 1, a plurality of groups of switching means, each group including its own scanner, digit register, and switching control apparatus, a translator common to said groups, means for selectively establishing an effective signal connection between the translator and a digit register of any group for translation.

6. In a switching system the combination as claimed in claim 1, further including terminating switching means, terminating switching control apparatus, means for extending the transmission of said control signals transmitted to said one trunk, from said one trunk to said terminating switching control apparatus, and means in said terminating switching control apparatus under control of said control signals for finding and establishing a communication path through said terminating switching means from said one trunk to a called line.

7. In a communication switching system the combination as claimed in claim 6, wherein said means for transmitting control signals from said digit register to said one line circuit comprises an effective signal connection including said scanner.

8. In a switching system the combination as claimed in claim 7, further including a pulse generator and a pulse distributor for supplying pulses in repetitive time position frames to the units including the said line circuits, said scanner, said digit register, and said switching control apparatus multiplex conductors inter-connecting said units, and means in said units enabled by said repetitive pulses for providing multiplex signal channels in respective time slots of said frames, the effective signal connections for transmitting control signals being supplied by said multiplex channels, a scanner serving a group of lines including said called line, and means for establishing an effective signal connection from said terminating control apparatus through the last said scanner to the line circuit of said called line for making a busy test of said called line and for transmitting ringing control signals to the line circuit of said called line.

9. In a communication switching system according to claim 7, a plurality of switching groups, each group comprising originating switching means controlled by originating switching control apparatus for selectively connecting any one of a plurality of line circuits to any one of a plurality of trunks, each group including a plurality of junctors, each of said trunks being connected to a junctor in one of said groups, each group including terminating switching means controlled by terminating switching control apparatus for selectively connecting any one of the junctors of the group to any one of the line circuits of the group, each of said switching means comprising a plurality of switching stages arranged in tandem, each stage comprising a plurality of switching elements.

10. In a communication switching system the combination as claimed in claim 9, further including a pulse generator and a pulse distributor for supplying pulses in repetitive time position frames to the units including the said line circuits, said scanner, said digit register, and said switching control apparatus, multiplex conductors inter-connecting said units, and means in said units enabled by said repetitive pulses for providing multiplex signal channels in respective time slots of said frames, the effective signal connections for transmitting control signals being supplied by said multiplex channels, wherein each of said switching groups includes a plurality of digit registers, means for selectively connecting one of said digit registers to the multiplex channel of a calling line, wherein the said means for transmitting control signals from said one trunk to the terminating switching control apparatus includes the junctor connected to said trunk and a multiplex channel extending from the said junctor to said terminating switching control apparatus.

11. In a communication switching system the combination as claimed in claim 10, wherein each said junctor includes means for holding operated the switching elements in both the originating switching means and the terminating switching means of a communication path which includes said junctor.

12. In a communication switching system the combination as claimed in claim 11, further including means for establishing a multiplex connection in one of said time position channels from said terminating switching control apparatus through the scanner of the group to the line circuit of the called line for testing the called line for busy and for transmitting ringing control signals.

13. In a communication switching system the combination as claimed in claim 12, wherein responsive to the called line testing busy the said junctor releases the switching elements of the communication path in the originating and terminating switching means, and means for transmitting busy tone to the calling line through its line circuit under control of the said register which is effectively connected to the calling line circuit.

14. In a communication switching system the combination as claimed in claim 13, further including means for transmitting ringback tone from the line circuit of said called line over said communication path to the calling line responsive to an idle test of the called line, and further including means operative when the called line is busy and said busy tone has been transmitted to the calling line for a given time interval for releasing the said register connected to the calling line and for transmitting a service request to the scanner if the line is still in use.

15. In a communication switching system according to claim 14, a translator common to all of said switching groups, and means for establishing a multiplex connection in said time position channels to any digit register of any group for translation.

16. A communication switching system comprising a plurality of switching groups each serving a plurality of lines, each of said groups including originating switching means controlled by originating-marker apparatus and including terminating switching means controlled by terminating-marker apparatus and linked by way of junctors with said originating switching means; translating means common to said plurality of switching groups; register-sender apparatus which is taken into use upon the origination of a call for registering called-line directory number information as transmitted over the calling line and for translating, under the control of said translating means, at least a part of said directory information into corresponding equipment location information; means for taking said originating-marker apparatus into use and for transferring part of said called-line equipment location information thereto to cause it to operate said originating switching means to selectively complete a connection between said calling line and a junctor associated with the called-line group; means for then taking said terminating-marker apparatus into use and for transferring part of said equipment location information thereto by way of said junctor to cause the terminating-marker apparatus to operate said terminating switching means to selectively complete a connection between said junctor and said called line; so that a communication path is established from the calling line, through the originating switching means, said junctor, and the terminating switching means to the called line.

17. A communication switching system according to claim 16, wherein each of said groups has register-sender apparatus individually associated therewith, and wherein said register-sender apparatus taken into use upon origination of a call is associated with the calling-line group.

18. A communication switching system according to claim 16 which includes a plurality of primary-secondary line-frame switching units common to said originating and said terminating switching means, said originating switching means further including selector switching means for extending the originating connections from the line-frame units to the junctors of selected called line groups, and said terminating switching means further includes terminating-frame switching units for extending the terminating connections from said junctors to said line-frame units.

19. A communication switching system comprising a plurality of switching groups each serving a plurality of lines, a plurality of trunks inter-connecting said groups, each group including a multi-stage switching network for extending originating connections from calling ones of said lines to said trunks and for extending terminating connections from said trunks to called ones of said lines, said network including a plurality of line-frame units and group-selector units, the lines served by each group being divided into a plurality of sub-groups, each sub-group being served by one line-frame unit and one associated group-selector unit, each line-frame unit comprising a plurality of primary coordinate switches and a plurality of secondary coordinate switches with line links spread between them, each group-selector unit comprising a plurality of coordinate switches, and intra-group links extending from the secondary switches of each line-frame unit to the switches of the corresponding group-selector unit, whereby a group may be partially equipped with only the number of line-frame units and corresponding group-selector units equal to the number of sub-groups of lines actually served.

20. A communication switching system according to claim 19, wherein each group serves a plurality of trunks divided into sub-groups for terminating connections to that group, said network further including a plurality of terminating-frame units, each such terminating-frame unit comprising coordinate switch means for extending connections from one of said sub-group of trunks to the secondary switches of said line-frame units.

21. A communication switching system according to claim 20, wherein each of said terminating-frame units comprises two switching stages, with the outputs of the second stage connected in multiple with said intra-group links which extend between the secondary line-frame switches and the group-selector switches.

22. A communication switching system according to claim 20, wherein each said group includes a plurality of junctors each coupling one of said trunks to its terminating-frame unit, and wherein said network further includes a level-selector stage for extending connections from said group-selector units to said trunks so that an originating connection is extended in said network in the calling line group from the calling line through the primary-secondary line frame unit, a group selector unit, and a level-selector over one of said trunks to a junctor of the called line group, and a terminating connection is extended in said network in the called-line group from said junctor through a terminating frame unit and a line frame unit to the called line.

References Cited in the file of this patent

UNITED STATES PATENTS

| | | |
|---|---|---|
| 2,674,657 | Bellamy et al. | Apr. 6, 1953 |
| 2,774,822 | Dunlap et al. | Dec. 8, 1956 |
| 2,812,385 | Joel et al. | Nov. 5, 1957 |
| 2,830,125 | Elliott | Apr. 8, 1958 |
| 2,853,553 | Almquist et al. | Sept. 23, 1958 |
| 2,890,284 | Flood | June 9, 1959 |
| 2,890,286 | Flood | June 9, 1959 |
| 2,894,072 | Abbott et al. | July 7, 1959 |